United States Patent [19]

Reinwall, Jr.

[11] 4,231,281
[45] Nov. 4, 1980

[54] ADJUSTABLE SPACER-CAM ASSEMBLY

[75] Inventor: Ernest W. Reinwall, Jr., McHenry, Ill.

[73] Assignee: Illinois Tool Works Inc., Chicago, Ill.

[21] Appl. No.: 2,422

[22] Filed: Jan. 10, 1979

[51] Int. Cl.³ .................. F16B 43/02; F16B 39/26
[52] U.S. Cl. ................................. 85/50 AT; 85/62; 151/38; 151/41; 403/374; 403/409
[58] Field of Search ............... 85/50 AT, 50 B, 50 C, 85/50 R, 61, 62; 151/38, 37, 41, 40, 39; 403/409, 374, 410, DIG.7; 292/241, 64, 69

[56] References Cited

U.S. PATENT DOCUMENTS

| D. 230,469 | 2/1974 | Reynolds | D8/274 |
| 2,506,879 | 5/1950 | Lieb | 292/241 |
| 2,675,044 | 4/1954 | Poupitch | 151/41.5 |
| 3,188,115 | 6/1965 | Morrish et al. | 151/41 X |
| 3,236,277 | 2/1966 | Jones, Jr. et al. | 151/38 |
| 3,389,734 | 6/1968 | Gutshall | 151/37 |
| 3,628,584 | 12/1971 | Gutshall | 151/38 |
| 3,856,066 | 12/1974 | Reynolds | 151/38 |
| 3,960,048 | 6/1976 | Wagner | 151/38 X |
| 4,034,788 | 7/1977 | Melone | 151/41 X |

FOREIGN PATENT DOCUMENTS 115963  9/1942  Australia ................... 292/241

*Primary Examiner*—Ramon S. Britts
*Attorney, Agent, or Firm*—Richard K. Thomson; Robert W. Beart

[57] ABSTRACT

An adjustable spacer-cam assembly designed to close gaps which fall within a predetermined range of widths. The assembly includes: a cam plate which has a peripheral increasing-height ramp, a spring washer, and a threaded fastener. Serrations on the underneath surface of the fastener head engage serrations on the upper surface of the washer forming a friction clutch by which the cam plate is driven. Torque is transmitted from the washer to the cam plate by projections on the bottom of the washer which engage in apertures in the cam plate. The spacer-cam plate is driven until the ramp wedges between the members forming the gap causing the friction clutch members to slip.

11 Claims, 5 Drawing Figures

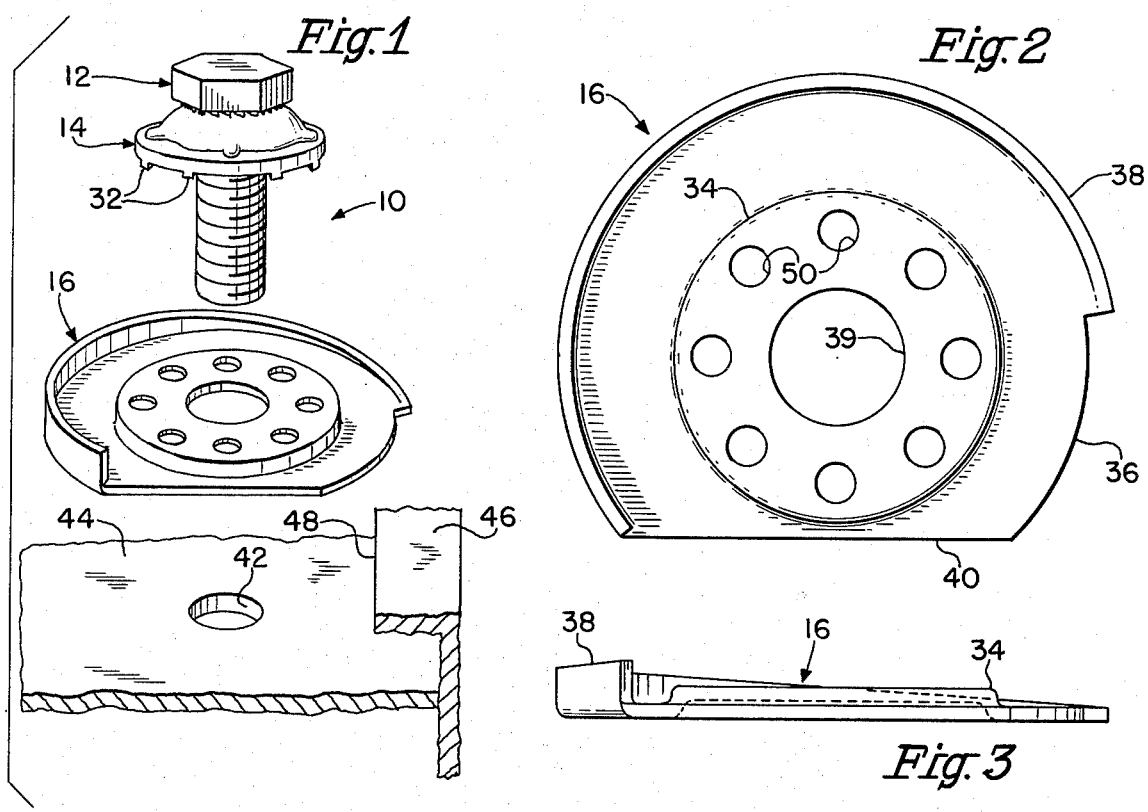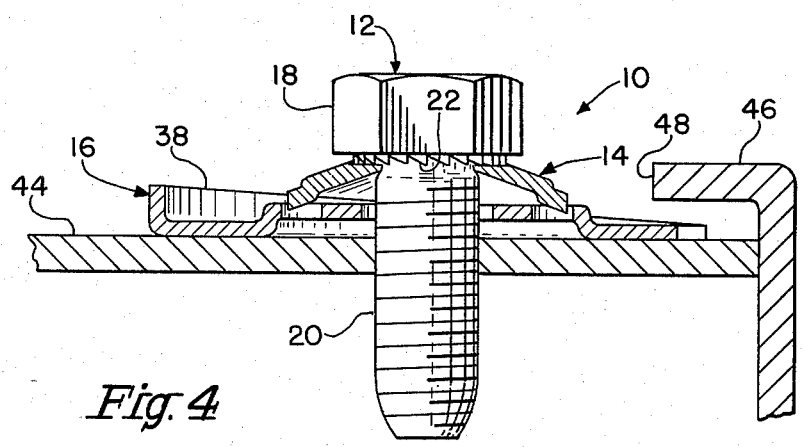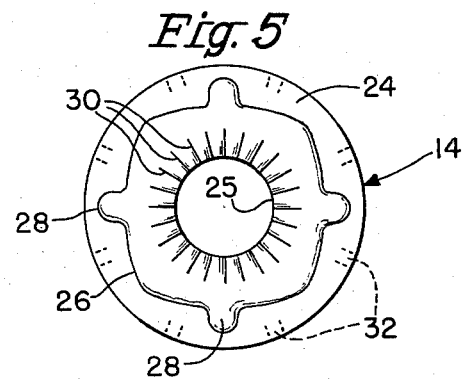

ADJUSTABLE SPACER-CAM ASSEMBLY

BACKGROUND OF THE INVENTION

Certain applications in the automotive industry require a means which is capable of filling a gap of varying size. A specific such application is in a radiator assembly. Longitudinal cooling coils and upper and lower radiator plates extend between a pair of vertically extending flanged side plates and are soldered thereto. In order to account for dimensional tolerances and thermal coefficients of expansion, the side members are made slightly longer than necessary with the result that small gaps remain between the laterally extending plates and the flanges which extend from the side plates.

Due to the fragile nature of the solder joints, it is essential that these gaps be plugged to provide rigidity to the radiator assembly. Otherwise, the vibrational environment to which the radiator is subjected would cause warping with resultant breaking or cracking of the solder joints.

Prior to this invention, the method used to fill those gaps comprised soldering an appropriate number of shims constituting a sufficient thickness to fill the gap between the horizontal plates and the laterally extending flanges of the vertical side plates. Such a remedy is not entirely satisfactory for a number of reasons. First, since the gaps are not of uniform size, a variety of thicknesses of shims must be kept on hand. Further, while the gap may appear to be filled by the shims, the gap may actually be under or over filled. If under filled, the shims will be ineffective to prevent the shifting they are supposed to prevent. If the gap is over filled, the shims may created torsional moments tending to spread the side plates apart.

SUMMARY OF THE INVENTION

It is an object of this invention to provide a single means which is capable of filling gaps within a predetermined range of sizes.

It is another object of this invention to provide a spacer-cam assembly which includes a varying height ramp to bridge a range of gap sizes.

It is a further object of the invention to provide a spacer-cam assembly which may be rotated into gap-bridging position by means of a friction clutch wherein, when the spacer-cam is properly positioned, the friction clutch will slip.

It is a further object of the invention to provide a spacer-cam which may be manufactured as a one-piece stamping with relatively few machine operations being necessary to complete formation.

These and other objects and advantages will become more apparent from the following detailed description when considered in conjunction with the accompanying drawing, wherein like reference numerals through the various views are intended to designate similar elements.

BRIEF DESCRIPTION OF THE DRAWING

FIG. 1 is an exploded perspective view of the spacer-cam assembly in operating position;

FIG. 2 is a plan view of the spacer-cam;

FIG. 3 is a side elevational view of the spacer-cam shown in FIG. 2;

FIG. 4 is a side elevational view in partial section of the spacer-cam assembly with the screw in operative engagement in the upper radiator plate; and, FIG. 5 is a plan view of the spring washer used in the spacer-cam assembly.

DETAILED DESCRIPTION OF THE INVENTION

The adjustable spacer-cam assembly shown generally at 10 comprises three basic elements: a screw fastener 12, a spring washer 14, and a spacer-cam plate 16.

The screw fastener 12 has a head 18 and a shank 20, the head having a hexagonal configuration or some other means to permit the screw to be engaged and driven by a torque-inducing tool (not shown). The shank 20 is threaded and, preferably, is provided with thread-cutting capability so the receiving aperture need not be pre-threaded. The bottom surface of the head 18 is provided with a friction-increasing means in the form of serrations 22 for reasons which will become clear herebelow.

The spring washer 14 is circular with an outer peripheral portion 24 which engages cam plate 16. A circular aperture 25 extends through the center of the washer. The washer has a central, axially-compressible raised portion 26 which is generally square. This raised portion has a plurality of reinforcing ribs 28. On the top side of the raised portion are a plurality of serrations 30 which form friction-enhancing means. On the lower side of the outer peripheral portion 24, there are provided a plurality of equally spaced drive-inducing means in the form of projections 32. The washer is preferably mounted on the shank of the screw prior to thread-rolling. Once the shank is thread-rolled, the washer will be rotatably, but irremovably, mounted on the screw in a manner which is, per se, known in the art.

The spacer-cam plate 16 is a generally disc-shaped cam member with a circular, elevated, central portion 34. A flange member 36 extends outwardly from the lower edge of the elevated portion and has an increasing ramp portion 38 extending about part of its periphery. As shown in the drawing, this angular extent is 210° but could be more or less than this amount. An aperture 39 extends through the center of the raised portion. Part of the flange which does not have a ramp portion thereon has a truncated flat edge 40. The radial distance from the center of the aperture to the flat edge 40 is equal to the distance from the center of aperture 42 in the workpiece 44 to the edge 48 of the side flange 46. The flat edge thereby facilitates the mounting and insertion of the spacer-cam assembly 10. The raised central portion has a plurality of apertures 50 therein, the number and spacing of said apertures corresponding to the number and spacing of projections 32 on washer 14.

In operation, the preassembled screw and washer is combined with the cam plate by inserting shank 20 through aperture 39. The spacer-cam assembly is then positioned with the leading end of the shank 20 received in aperture 42 and the flat 40 on cam plate 16 parallel to and adjacent to flange edge 48. Torque is applied to the fastener head 18 by a tool. As the fastener is threadingly advanced into the workpiece, friction-increasing means 22 on the lower side of head 18 engage friction-enhancing means 30 on the upper side of spring washer 14 thereby forming a friction clutch and causing the washer to rotate with the fastener. The drive-inducing projections 32, in turn, engage in drive-receiving apertures 50 thereby rotating cam plate 16. The ramp 38 increases in height proceeding in a counter-clockwise direction about the periphery of the cam plate. Therefore, as the assembly is rotated in a clockwise direction, the cam height between flange 46 and plate 44 increases until the cam is wedged therebetween. When this occurs, the wedging frictional resistance to further rotational advancement exceeds the frictional force transmitted between the clutch members and the clutch slips. Further application of torque to the fastener head will merely flatten the washer. The vertical surface on serrations 22 prevent the fastener from backing off and, therefore, maintain the cam plate in tightly wedged engagement.

It will be understood that modifications may be made to the cam assembly as by changing the friction means or reshaping the apertures, projections, cam plate, etc. It is further understood that even though a particular application has been disclosed, application of the invention is not limited thereto. Accordingly, the invention is intended to embrace all such alternative embodiments and uses as fall within the spirit and scope of the appended claims.

I claim:

1. An adjustable spacer-cam assembly comprising in combination a generally disc-shaped cam plate; said plate having an elevated central portion, the upper surface of said central portion having a plurality of drive-receiving means thereon, a flange member extending outwardly from the bottom of the central portion and having a continuously-increasing, upwardly-directed ramp extending about a portion of its outer periphery; said cam plate having an aperture extending through the central portion of the cam; a spring washer member having a central aperture, friction-enhancing means on the upper surface thereof, and a plurality of drive-inducing means on the underneath surface thereof adapted to cooperate with the drive-receiving means of the cam plate; a screw member having a threaded shank portion and a headed portion including surfaces adapted to be engaged by a torque-inducing tool, and friction-increasing means on the underneath surface thereof; said shank portion being adapted to be received in the central apertures of both the spring washer and the cam plate's central portion and further extending into an aperture in a workpiece; whereby as the screw is rotated and advanced into the aperture in the workpiece by said torque-inducing tool, rotational force is transmitted from the screw to the washer by means of their respective engaged surfaces which have friction-increasing and friction-enhancing means thereon and, correspondingly, from the drive-incuding means of the washer to the cam plate by means of its drive-receiving means; the ramp portion increasing in height in a direction opposite to the direction of rotation such that, as the cam is rotated, the ramp portion will adjustably occupy a variable amount of space between the workpiece and another element attached thereto.

2. The adjustable spacer-cam assembly of claim 1 wherein the drive-receiving means of the cam plate comprises a plurality of equally-spaced apertures.

3. The adjustable spacer-cam assembly of claim 2 wherein the apertures are circular.

4. The adjustable spacer-cam assembly of claim 2 wherein the drive-inducing means of said spring washer comprises a plurality of equally spaced projections, said projections corresponding in spacing and number to the apertures of said cam plate.

5. The adjustable spacer-cam of claim 1 wherein the friction-enhancing means of the upper surface of the spring washer comprises a plurality of serrations thereon.

6. The adjustable spacer-cam of claim 1 wherein the friction-increasing means on the underneath surface of the head portion of the screw comprises a plurality of serrations thereon.

7. The adjustable spacer-cam of claim 1 wherein the portion of the periphery about which the cam extends includes an angle of 210°.

8. The adjustable spacer-cam of claim 1 wherein the periphery of the cam plate flange includes a flat edge portion.

9. The adjustable spacer-cam of claim 1 wherein the spring washer comprises an axially compressible portion and a substantially continuous, outer peripheral, cam-engaging portion.

10. The adjustable spacer-cam of claim 9 wherein the spring washer further comprises a raised, generally square central portion, which portion bears the friction-enhancing means and said outer peripheral portion bearing the drive-inducing means.

11. The adjustable spacer cam of claim 1 wherein the friction-enhancing means on the upper surface of the washer and the friction-increasing means on the underneath surface of the headed portion of the screw form a friction clutch by which the spacer cam is rotationally driven until the wedging frictional resistance to further advancement of the ramp exceeds the frictional forces between the clutch members.

* * * * *